United States Patent [19]

Seshadri et al.

[11] Patent Number: 5,420,851

[45] Date of Patent: May 30, 1995

[54] METHOD OF MULTIPLE ACCESS

[75] Inventors: Nambirajan Seshadri; Carl-Erik W. Sundberg, both of Chatham, N.J.; Wai-Choong Wong, Singapore, Singapore

[73] Assignee: AT&T Corp., Murray Hill, N.J.

[21] Appl. No.: 157,778

[22] Filed: Nov. 24, 1993

[51] Int. Cl.⁶ .............................................. H04J 3/17
[52] U.S. Cl. .................................. 370/29; 370/85.7; 370/95.1
[58] Field of Search .................. 370/24, 29, 79, 80, 370/81, 85.7, 95.1, 95.3, 104.1; 455/12.1, 13.2, 49.1, 51.1

[56] References Cited

U.S. PATENT DOCUMENTS

| | | | |
|---|---|---|---|
| 4,841,521 | 6/1989 | Amada et al. | 370/29 |
| 4,949,335 | 8/1990 | Moore | 370/29 |
| 4,979,170 | 12/1990 | Gilhousen et al. | 370/104.1 |
| 4,987,571 | 1/1991 | Haymond et al. | 370/95.3 |
| 5,025,442 | 6/1991 | Lynk et al. | 370/29 |
| 5,117,423 | 5/1992 | Shepherd et al. | 370/29 |
| 5,200,956 | 4/1993 | Pudney et al. | 370/29 |

OTHER PUBLICATIONS

T. Mike et al., "Psuedo-Analog Speech Transmission in Mobile Radio Communication Systems," *IEEE Transactions on Vehicular Technology*, 69–77, vol. 42, No. 1 (Feb. 1993).
C-E. W. Sundberg et al., "Digital Cellular Systems for North America," *Globecom '90*, 0533–0537, vol. 1, San Diego, Calif. (Dec. 1990).
L. M. Paratz et al., "Speech Transmission Using an Adaptive Burst Mode Technique," *IEEE Transactions on Communications*, 588–591, vol. COM-33, No. 6 (Jun. 1985).
W. C. Wong et al., "Low Delay, High Quality Wireless Digital Speech Communications by Shared Time Division Duplexing," *Globecom '93 Conf. Proc.*, Houston, Tex. (Nov. '93).
D. J. Goodman "Second Generation Wireless Information Networks," *IEEE Transactions on Vehicular Technology*, 366–374, vol. 40, No. 2 (May 1991).
D. J. Goodman et al., "Packet Reservation Multiple Access for Local Wireless Communications," *IEEE Transactions on Communications*, 885–889, vol. 37, No. 8 (Aug. 1989).
J. J. C. Chang et al., "Wireless Systems and Technologies: An Overview," *AT&T Technical Journal*, 11–18 (Jul./Aug. 1993).
T. P. Bursh, Jr., et al., "Digital Radio for Mobile Applications," *AT&T Technical Journal*, 19–26 (Jul./Aug. 1993).
N. Seshadri et al., "Advanced Techniques for Modulation, Error Correction, Channel Equalization, and Diversity," *AT&T Technical Journal*, 48–63 (Jul./Aug. 1993).
S. Nanda et al., "Variable Partition Duplexing for Wireless Communcations," *Globecom '91*, 1147–153 (1991).
S. S. Lam, "Packet Broadcase Networks—A Performance Analysis of the R-ALOHA Protocol," *IEEE Transactions on Computers*, 596–603, vol. C-29, No. 7 (Jul. 1980).

*Primary Examiner*—Benedict V. Safourek
*Attorney, Agent, or Firm*—Katharyn E. Olson

[57] ABSTRACT

A low delay multiple access scheme called Shared Time-Division Duplexing (STDD), allows both uplink and downlink voice traffic to share a common channel. The scheme contains separate uplink and downlink control channels and a common voice information channel. The control channels comprise means for signalling voice requirements and acknowledgements of the time slot allocation. Using speech activity detection only, talk spurt speech packets are generated for transmission. STDD dynamically allocates time slots in the common information channel taking advantage of coordinated two-way conversations to achieve high statistical multiplexing gain and more efficient realization of the common information channel.

21 Claims, 2 Drawing Sheets

METHOD OF MULTIPLE ACCESS

TECHNICAL FIELD

The invention relates a multiple access scheme for a communication system.

BACKGROUND OF THE INVENTION

The design of a communication network or system involves evaluating physical constraints (e.g. the characteristics of a given communication channel) and system constraints (e.g. the available bandwidth per channel) in order to achieve a network with desired performance characteristics (e.g. reliability of the information received). Design of wireless communications, in particular design of the cellular and microcellular communications networks, has proven challenging. Cellular systems typically require low throughput delay of information and high reliability of information transfer and high capacity while restricting the bandwidth of each cellular frequency band.

FIG. 1 illustrates the components of a cellular or microcellular communications network. Cell 102 represents a portion of the geographic area served by the system. Within each cell is base station 105 which is connected to the public telephone network. Base station 105 establishes a wireless link with users $110-i, i=1,\ldots N$, wishing to transmit and receive information (i.e. digital data representing text, speech, video, etc.) via the public telephone network. The wireless link between any given user, $110-i$ and base station 105, is comprised of an uplink $U_i$ for transmitting information from a user to base station 105 and then to the telephone network and of a downlink $D_i$ for transmitting information received by the base station from the telephone network to the user.

Typically, concerns over throughput delay and efficient utilization of bandwidth resources in a network can be addressed by proper design or exploitation of modulation techniques, speech coding methods, channel coding and equalization schemes. See, J. J. C. Chang, R. A. Miska and R. A. Shober, "Wireless Systems and Technologies: An Overview," *AT&T Tech. J.*, Vol. 72, No. 4, pp. 11–18, July/August 1993; T. P. Bursh, Jr. et al., "Digital Radio for Mobile Applications," *AT&T Tech. J.*, Vol. 72, No. 4, pp. 19–26, July/August 1993; and N. Seshadri, C-E. W. Sundberg and V. Weerackody, "Advanced Techniques for Modulation, Error Correction, Channel Equalization, and Diversity," *AT&T Tech. J.*, Vol. 72, No. 4, pp. 48–63, July/August 1993. For example, to minimize delay, space diversity in conjunction with a small degree of channel coding can be used. Low rate speech coders, such as ADPCM, EDPCM or LD-CELP, and modulation methods, such as pseudo-analog skewed DPSK, are also well suited to reducing delay. See, T. Miki, C. -E. W. Sundberg and N. Seshadri, "Pseudo-Analog Speech Transmission in Mobile Radio Communications Systems," *IEEE Trans. Veh. Tech.*, Vol. 42, No. 1, pp. 69–77, February 1993. Bandwidth resource concerns may be addressed through proper design of a multiple access scheme. The goal of a multiple access scheme is to regulate communications for the various user pairs within a cell given a limited number of available frequencies, limited bandwidth per channel, etc. More particularly, proper design of a multiple access system is important in configuring a low delay, high quality digital communication network. See generally, C. -E. W. Sundberg and N. Seshadri, "Digital Cellular Systems for North America," *GLOBECOM'90*, Vol. 1, pp. 533–537, San Diego, Calif., December 1990.

Current wireless networks utilize multiple access schemes which multiplex users together in order to efficiently utilize network resources. In particular, these networks use either TDMA (time-division multiple access) with FDD (frequency division duplexing) as in the pan-European GSM system (now also known as Global System for Mobile Communication) and the North American IS-54 system, or a variant, TDMA/TDD (time-division duplexing), as in the Digital European Cordless telecommunications system. See, D.J. Goodman, "Second Generation Wireless Information Networks," *IEEE Trans. Veh. Tech.*, VT-40, No. 2, pp. 366–374, May 1991.

For the multiple access systems described here, frames of time are the basic transmission unit. Each frame is divided into a plurality of slots of time. Some slots are used for control purposes and some slots are used for information transfer as described below. The information is transmitted during slots in the frame where slots are assigned to a specific user. Throughout this disclosure, it is understood that the term "information" refers to data representing speech, text, video or other digital information.

FIG. 2 illustrates the principle of TDMA/TDD for purposes of comparison with other systems. Although standard TDMA/FDD has control information integrated into the headers of information sent in transmitted in information slots, for illustrative purposes, frame 201 is divided into three sections all of which are transmitted in the same frequency band. Control section 205 contains information which relates to call management. Uplink section 210 and downlink section 215 are each divided into N slots. Thus, the uplink and downlink for each user pair can has a guaranteed slot for transmitting information. However, the system capacity is low since a slot is assigned to each user and no re-allocation of slots is performed if a user decides not to utilize (i.e. transmit information during) an assigned slot.

Better utilization of network resources is obtained if the speech users are statistically multiplexed through the use of speech activity detection (SAD). FIG. 3 illustrates the format of TDMA/TDD/SAD frame 301 designed for use by up to N user pairs. TDMA/TDD/SAD frame 301 is divided into four sections. Uplink and downlink control sections 305 and 307 contain bits for handling call management function. Uplink control section 305 contains bits for handling requests for uplink information slots. Downlink control section 307 contains bits which indicate which uplink and downlink information slots are assigned for the uplink and downlink users to send and receive information. Uplink section 310 and downlink section 315 are also divided into slots. There are an identical number of slots, fewer than N, in each of the uplink and downlink sections. The SAD techniques recognizes that a significant portion of any information transfer, particularly a speech conversation, is comprised of silent portions, and no transmission of information need occur, i.e., although N user pairs are active and wish to transmit information at some point, chances are that not all users are using their allocated slots 100% of the time. Thus, the number of slots required to satisfactorily accommodate up to N user pairs can be significantly reduced through ongoing reassignment of slots from inactive to active users. The result is a higher capacity (since there will be a reduced number of slots transmitting no information) and lower delay (since the frames can be made shorter given the reduced number of slots) system. However, the system typically requires a greater portion of the frame be devoted to overhead (i.e. the control sections). Additionally, there will be insufficient resources to accommodate all users in times of peak demand, and thus some information will be lost because no slots will be available for data transmission and/or new user pairs will not be allowed access to the system.

Other multiple access techniques, such as PRMA (Packet Reservation Multiple Access) and R-ALOHA (Reservation ALOHA), recognize the bursty nature of speech packets and increase system capacity by having a reservation mechanism for time slots. See, D. J. Goodman, R. A. Valenzuela, K. T. Gayliard and B. Ramamurthi, "Packet Reservation Multiple Access for Local Wireless Communications," *IEEE Trans. Comm.*, COM-37, No. 8, pp. 885-890, August 1989; and S. S. Lam, "Packet Broadcast Network—A Performance Analysis of the R-ALOHA Protocol," *IEEE Trans. Comp.*, COMP-29, No. 7, pp. 596-603, July 1980. Although these schemes are able to support a large number of users on a given channel bandwidth, these schemes have limited operating ranges, and in the case of PRMA, perform poorly under low delay constraints. In addition, PRMA techniques rely on actual speech transmission, i.e. the user must be actively speaking, to allocate slots instead of relying on a separate control mechanism for allocating slots. This assignment method leads to collisions between packets of data and thus increases delay and throughput. Other systems recognize that in a two-way conversation, it often occurs that only one user is active, thereby making it possible to obtain a high statistical multiplexing gain even with a low number of users when information from both conversation paths are multiplexed onto a common channel. See, L. M. Paratz and E. V. Jones, "Speech Transmission Using an Adaptive Burst Mode Technique," *IEEE Trans. Comm.*, COM-33, No. 6, pp. 588-591, June 1985; S. Nanda and O.-C. Yue, "Variable Partition Duplexing for Wireless Communications," *GLOBECOM '91*, pp. 32.6.1-32.6.7. However, such systems have typically been used to dynamically vary bandwidth assigned to two parties in a single conversation (duplex voice link). This reduces speech quality when both parties are talking simultaneously or when their speech overlaps. In addition, managing slot assignment is difficult since fractional slot assignment is necessary. Thus, there is a need for a multiple access system capable of providing high capacity, high quality and low delay communications, particularly for wireless personal communications systems competing with wired systems.

SUMMARY OF THE INVENTION

In accordance with the present invention a multiple access scheme is described in which slots are dynamically allocated between uplink and downlink users. In the preferred embodiment a method is presented for allocating slots in a communication system adapted to communicate information in an assigned slot on uplinks and downlinks between a user pair in a set of N user pairs. The method generates a set of frames, where each frame contains S information slots, $S = U_S + D_S + A$, having $U_S$ slots allocated for communicating information on the uplink, having $D_S$ slots allocated for communicating information on the downlink, and having $A, A > 0$, unused slots. $U_S$ and $D_S$ are varied dynamically in such a way as to improve overall system quality and capacity.

DETAILED DESCRIPTION

Figure 4:
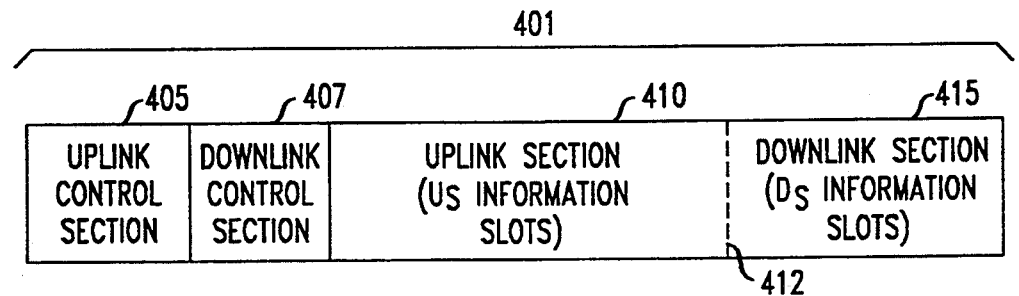
FIG. 4 is a diagram of an Shared Time-Division Duplexing frame format used in the present invention.

FIG. 4 illustrates a format for frame 401 useful in practicing the invention. The invention, a multiple access system termed Shared Time-Division Duplexing, is designed to regulate traffic among up to N user pairs while allocating slots between uplinks and downlinks dynamically, e.g. on a frame-by-frame basis. Frame 401 is divided into four sections. Call management functions are handled by separate uplink and downlink slots in uplink control section 405 and downlink control section 407, respectively, as described below. The remainder of frame 401 is divided into S slots, $S = U_S + D_S + A$, with $U_S$ slots allocated for uplink information transfer and $D_S$ slots allocated for downlink information transfer. A represents the number of slots, if any, not allocated. In frame 401 of FIG. 4, $A = 0$. The number of slots allocated between uplink section 410 and downlink section 415 can vary with each frame as indicated by partition 412. However, the total number of speech slots S remains fixed for every frame. When there are a few users in the system and the total number of slots in any one direction is less than $S/2$, the information slots behave in a TDD manner with the S slots equally partitioned for the uplink and downlink access. When the number of users increases and the number of required speech slots in either direction exceeds $S/2$, partition 412 between the uplink and downlink slots varies according to demand.

The ability to share a common frequency band contributes to a higher statistical multiplexing gain even for a narrowband system with a limited number of users. The value of S typically is selected based on three factors: 1) the desired quality of the received information, i.e. what level of packet loss is acceptable, 2) the number of user pairs to be accommodated, and 3) the accuracy of the speech activity detector, i.e. how well silences and pauses in information transfers can be detected. For example, for a system with $N = 32$ user pairs, 64 speech slots are required for standard TDMA/TDD while TDMA/TDD/SAD requires 46 at a high quality packet dropping rate of 0.01%. STDD typically requires 35 speech slots assuming a 2 millisecond frame size at the same dropping rate. The total statistical multiplexing gain is a function of the exact design of the control information.

Figure 1:
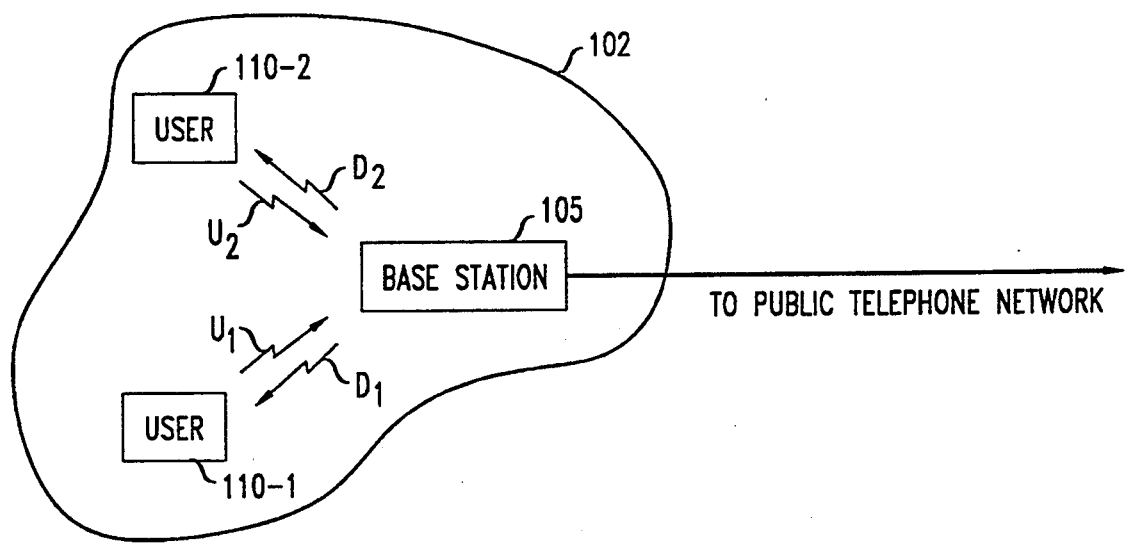
FIG. 1 illustrates the components of a cellular communications system.
Figure 5:
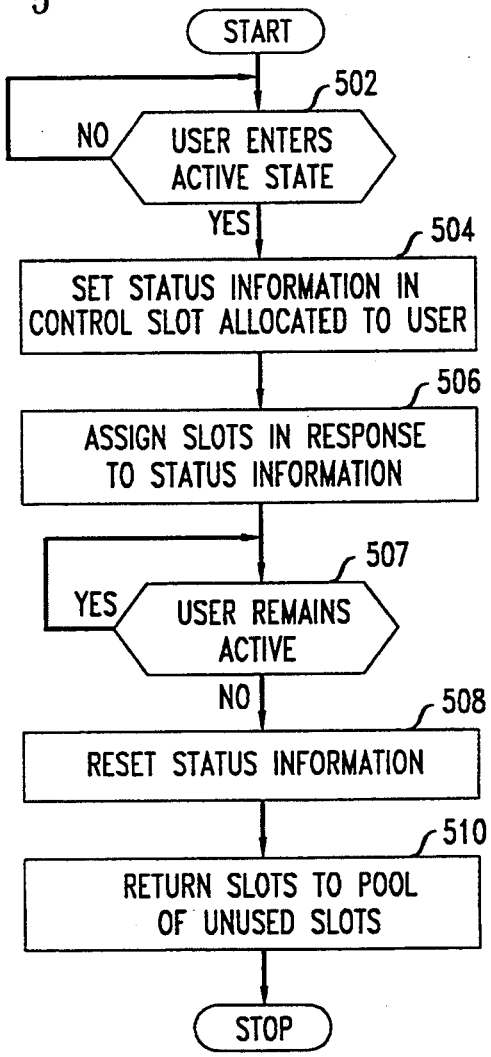
FIG. 5 is a flowchart of the steps in allocating slots in a frame in the present invention.
Figure 2:
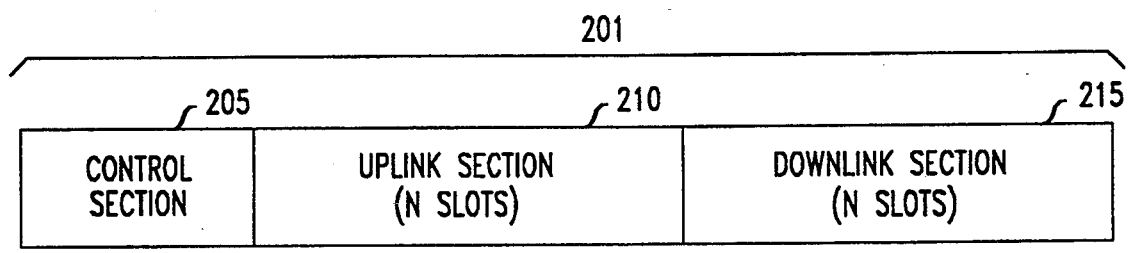
FIG. 2 is a diagram of a TDMA/TDD frame format known in the prior
Figure 3:
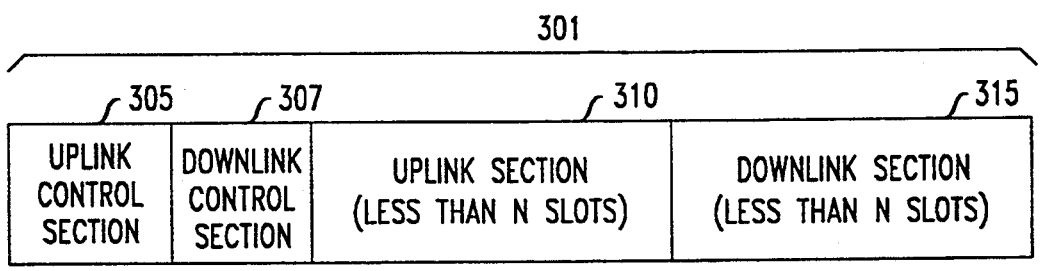
FIG. 3 is a diagram of a TDMA/TDD/SAD frame format known in the prior art.

FIG. 5 is a flowchart of the steps in allocating slots. Note that all signalling functions pertaining to call management in a cellular or microcellular system, including handoffs and termination (but typically not call set up functions), are communicated via information in the control sections. In addition, the control information also indicate the state of a transmission, i.e. whether a user is actively communicating information or is silent. When a user desires to send information and enters the active state in step 502, as for example when speaking, status information in the control slot assigned to the user requests a slot in the appropriate, i.e. uplink or downlink, information section from the base station as shown in step 504. Typically, this may be implemented using a first-come, first served (FIFO) service discipline in assigning information slots to users although other disciplines, e.g. random service, may also be used. Similarly, the base station is aware of all slot requests emanating from the wired end of the network, and it assigns slots accordingly in step 506. The slot assignment information is carried in the downlink control information slots for both uplink and downlink users. Thus, it is advantageous to have transmission of uplink control information precede in time transmission of downlink control information so as to reduce delay. If a slot is not allocated to a user upon request, the information is dropped. When the information transfer is complete, the status information is reset in steps 508 and the slot is returned to a pool of unused slots in step 510. The amount of control information is dictated by the needs of call management functions and the frequency of transmission activity.

The use of separate control and information slots helps alleviate the overhead efficiency problem common in PRMA-type networks and permits implementation of a simple access mechanism that advantageously works with speech activity detection while providing low access delay. Uplink control section 405 and downlink control section 407 may each contain N control slots. However, the overhead per frame can be reduced by establishing a duty cycle for the control information. For example, let the total number of control slots be 2C, where C is the number of uplink or downlink control slots, and let N (N being a multiple of C) be the maximum number of user pairs that can be supported. In general, $C<N$, and hence only C user pairs can communicate their control information to and from the base station in one frame period. Thus, it takes a total of $K=N/C$ frame periods for all user pairs to be serviced this way, i.e. K is the duty cycle to service all users. This access mechanism ensures that all users are guaranteed service within K frame periods. At the same time, since acknowledgements are communicated within the same frame period, a user with an acknowledged reservation can immediately send his speech packets within the same frame. Note that when a user makes a reservation for speech packets the user keeps the reservation for a minimum of K frame periods. For example, if the frame period is 2 ms., N=40, and C=5, then the duty cycle is 8 with a cycle period of 16 ms. Of course, the larger the duty cycle the smaller the amount of control overhead information. In STDD a suitable cycle period is 16 ms where it is conveniently synchronized to the speech activity detection rate.

Even in the STDD system there may be situations where not all information slots are utilized, i.e. $A \neq 0$. This spare capacity can be used for call setup when a new call arrives into the system. Assume that a new user monitors the control slots for a minimum of one cycle period to ascertain the status of the information slots, i.e. to determine if all slots have been assigned. Thereafter, the system can use the spare information slots as a contention channel to inform the base station of this setup request by using, for example, an ALOHA-type of random access. If there are A ($A \leq S$) available slots, the new call randomly selects one of these A slots to transmit its setup request packet. This request successfully reaches the base station if no other user transmits in the same slot. If the total number of user pairs currently serviced is less than N, the new call will be successfully serviced and an acknowledgment is sent on the next available downlink control slot. The location of this control slot also determines the new call's position in the control cycle stream. As noted above, when there are few users, STDD behaves as a TDMA/TDD/SAD system with slots equally allocated between the uplink and downlink. In this case, spare information slots used to set up a call should be treated as information slots so that slots remain equally allocated until such time that conditions demand that the partition between uplink an downlink slots be moved. The system above is described for up to N user pairs per carrier frequency. A number of carder frequencies, each carrying up to N user pairs, can be used in high traffic areas.

Although the previous embodiments have focussed primarily on speech transmission, STDD can be used for mixed traffic conditions, e.g. where some slots carry data and some carry speech. STDD can also be implemented in a variable rate per user mode, e.g. a variable speech quality mode where a larger number of bits are allocated to customers requiring video or higher quality audio. The control channel contains the appropriate information. Thus, this method can be advantageously used where there is a broadband/narrowband information transfer between users in a user pair. In further embodiment, the dynamic allocation of slots between the uplink and downlink based on demand is implemented by means of frequency division where information is carried over dynamically allocated orthogonal frequency channels, or alternatively in a code division mode where traffic is carried by means of direct sequence spread spectrum with pseudo-orthogonal codes or in combinations of time division, frequency division and code division schemes. In another embodiment, the STDD format can be used in conjunction with a pseudo-analog skewed DPSK modulation scheme to further reduce throughput in a communications system.

The above detailed description has illustrated a method in which slots in a frame are dynamically allocated between uplink and downlink users. The method has not been limited to specific hardware or software. Instead, the method has been described in such a manner that those skilled in the art can readily adapt such hardware or software as may be available or preferable.

We claim:

1. In a communication system adapted to communicate information between user pairs in a set of N user pairs, a method of allocating slots comprising the steps of:

generating a set of frames, wherein each frame in said set of frames comprises S slots for communicating information, and assigning to a first user in a user pair, only when said first user requests a slot to communicate information, a first slot for communicating information to a second user in said user pair, said first slot being assigned as one of either an uplink or a downlink slot, and assigning to a second user in said user pair, only when said second user requests another slot to communicate information to said first user in said user pair, a second slot for communicating information, said second slot being assigned as the other of said uplink or said downlink slot.

2. The method of claim 1 wherein each uplink control slot comprises information indicating whether a first user assigned to the uplink control slot is transmitting information and indicating which uplink control slot is assigned to said first user, and wherein each downlink control slot comprises information indicating whether a second user assigned to the downlink control slot is transmitting information and indicating which downlink control slot is assigned to said second user.

3. The method of claim 2 wherein said uplink control slots and said downlink control slots are each C in number wherein N is a multiple of C and wherein $K=N/C$ is the duty cycle to service said N user pairs.

4. The method of claim 1 wherein each frame in said set of frames further comprises uplink control slots and downlink control slots and wherein said step of assigning to said first user further comprises the steps of:
sending status information in a control slot allocated to said first user when said first user requests said slot, and
allocating slots to $U_S$ and to $D_S$ in response to said status information.

5. The method of claim 1 wherein S is a function of the amount of information that can be lost in transmission, the transmission activity of users in said set of N user pairs and the total number of user pairs, N.

6. A method for use in a communication system adapted to communicate information in a frame, said frame comprising S slots for communicating information, said method comprising the steps of:
assigning to a first user in a user pair, only when said first user requests a slot to communicate information, a first slot for communicating information to a second user in said user pair, said first slot being assigned as one of either an uplink slot or a downlink slot, and
thereafter assigning to a second user in said user pair, a second slot for communicating information, said second slot being assigned as the other of said uplink or said downlink slot, said second slot being assigned only when said second user has information to be communicated to said first user.

7. The method of claim 6 wherein said slots in said S slots are assigned to a user in a user pair on a first come-first served basis.

8. The method of claim 6 further comprising the step of sending second status information in a control slot assigned to a user in a user pair when said user has no more information to communicate in the assigned slot.

9. The method of claim 6 wherein said communicated information is communicated using pseudo-analog skewed DPSK.

10. The method of claim 6 further comprising the step of assigning at least one of the A unassigned slots as a random access contention channel for call set up when new users wish to access said communication system.

11. The method of claim 6 wherein said uplink control slots are communicated prior to said downlink control slots.

12. The method of claim 6 wherein said S slots are equally assigned to $U_S$ and $D_S$ until such time that $U_S$ or $D_S$ require more than S/2 slots.

13. The method of claim 6 wherein said uplink control slots and said downlink control slots are each C in number, wherein said user pairs are N in number, wherein N is a multiple of C and wherein $K=N/C$ is the duty cycle to service all N user pairs.

14. The method of claim 6 wherein the A unassigned slots are positioned between the $U_S$ uplink slots and the $D_S$ downlink slots.

15. The method of claim 14 further comprising the step of assigning the $U_S$ uplink slots and $D_S$ downlink slots from opposite ends of the S information slots.

16. The method of claim 6 further comprising the step of:
sending first status information in a control slot allocated to a particular user in a user pair when said particular user requests a slot.

17. The method of claim 16 wherein said S slots are partitioned in response to said status information.

18. In a communication system adapted to communicate information in slots from users to said communication system and from said communication system to said users, a method comprising the steps of:
generating a set of frames, wherein each frame in said set of frames comprises said slots for communicating information,
allocating to a first user a slot for communicating information, said slot being allocated as an uplink slot from said first user to said communication system, and
thereafter allocating to a second user the same slot for communicating information, said same slot being allocated as a downlink slot from said communication system to said second user, said same slot being assigned only when said second user has information to be communicated to said first user.

19. In a cellular communication system adapted to communicate information on uplink slots from users to a base station in said communication system and to communicate information on downlink slots from said base station in said communication system to said users, a method comprising the steps of:
generating a set of frames, wherein each frame in said set of frames comprises slots for communicating information,
allocating to a first user a slot for communicating information, said slot being allocated as an uplink slot from said first user to said base station in said communication system, and
thereafter allocating to a second user the same slot for communicating information, said same slot being allocated as a downlink slot from said base station in said communication system to said second user.

20. A method for use in a base station of a communication system in which each of a plurality of remote stations communicates to said base station in an uplink slot of a time division multiplex frame and receives communications from said base station in a downlink slot of said frame, said method comprising the steps of:
receiving a request from a particular one of the remote stations for the assignment of an uplink slot to that remote station,
in response to said request, assigning to said particular remote station a particular first one of the slots of said frame as an uplink slot without also assigning a downlink slot to said particular remote station in response to said request, and
thereafter assigning to said particular remote station a particular second one of the slots of said frame as a downlink only when said base station has received communications destined for said particular remote station.

21. A method for use in a base station of a communication system in which remote stations communicate to said base station in assigned uplink slots of a time division multiplex frame and receive communications from said base station in assigned downlink slots of said frame, said method comprising the step of:

assigning individual ones of the slots of said frame to ones of said remote stations as uplink slots at a first time and assigning those same slots to others of said remote stations as downlink slots at a subsequent time.

* * * * *